US012612112B2

(12) United States Patent
Alwan et al.

(10) Patent No.: US 12,612,112 B2
(45) Date of Patent: Apr. 28, 2026

(54) VEHICLE HAVING FRONT AND REAR VEHICLE STRUCTURES

(71) Applicant: Ford Global Technologies, LLC, Dearborn, MI (US)

(72) Inventors: Jamil M. Alwan, Ann Arbor, MI (US); Petros Frantzeskakis, Canton, MI (US); Michael Jon Gutowski, Saline, MI (US); Shawn Michael Morgans, Chelsea, MI (US); Erik Billimoria, Canton, MI (US); Henry W. Hausler, New Hudson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 382 days.

(21) Appl. No.: 18/495,070

(22) Filed: Oct. 26, 2023

(65) Prior Publication Data

US 2025/0136187 A1 May 1, 2025

(51) Int. Cl.
B62D 25/08 (2006.01)
B62D 25/04 (2006.01)
B62D 27/02 (2006.01)

(52) U.S. Cl.
CPC ............. B62D 25/08 (2013.01); B62D 25/04 (2013.01); B62D 27/023 (2013.01)

(58) Field of Classification Search
CPC ....... B62D 25/08; B62D 25/04; B62D 27/023
See application file for complete search history.

(56) References Cited

U.S. PATENT DOCUMENTS 8,491,047 B1 * 7/2013 Moll ..................... B62D 25/04
296/193.06
2019/0152548 A1 5/2019 Shimizu
2022/0363328 A1 11/2022 Xin et al.

FOREIGN PATENT DOCUMENTS

CN 113226895 B * 12/2022 ........... B62D 27/023
WO 2022006381 1/2022

* cited by examiner

*Primary Examiner* — Faye M Fleming
(74) *Attorney, Agent, or Firm* — Burris Law, PLLC

(57) ABSTRACT

A vehicle that includes a front vehicle structure and a rear vehicle structure. The front vehicle structure includes a left first pillar and a right first pillar. The rear vehicle structure includes a left second pillar and a right second pillar. One of the left first pillar and the left second pillar defines a plurality of left channels. One of the right first pillar and the right second pillar defines a plurality of right channels. A plurality of left interface bodies. Each left interface body is coupled to the other one of the left first pillar and the left second pillar and received in a respective left channel. A plurality of right interface bodies. Each right interface body is coupled to the other one of the right first pillar and the right second pillar and received in a respective right channel.

20 Claims, 14 Drawing Sheets

14

90

12

VEHICLE HAVING FRONT AND REAR VEHICLE STRUCTURES

FIELD

The present disclosure relates to a vehicle having front and rear vehicle structures.

BACKGROUND

The statements in this section merely provide background information related to the present disclosure and may not constitute prior art.

Conventional vehicle assembly processes are typically linear processes that involves sequential build of a vehicle body structure referred to as Body in White, followed by painting the body structure, and then involves securing vehicle components such as a power train assembly, suspension assemblies, and an instrument panel assembly, for example, to a vehicle structure (e.g., uni-body structure) as the vehicle structure moves along an assembly line. Assembly of vehicle components to the vehicle structure may be slowed down due to restricted access to the vehicle structure at different points along the assembly line.

The present disclosure addresses these issues related to the access to the vehicle structure to secure vehicle components thereto as the vehicle structure moves along the assembly line.

SUMMARY

This section provides a general summary of the disclosure and is not a comprehensive disclosure of its full scope or all of its features.

In one form, the present disclosure discloses a vehicle that includes a front vehicle structure, a rear vehicle structure, a plurality of left interface bodies, a plurality of right interface bodies, a plurality of left attachment structures, and a plurality of right attachment structures. The front vehicle structure includes a left first pillar and a right first pillar. The rear vehicle structure defines a left door opening and a right door opening and includes a left second pillar that partially defines the left door opening and a right second pillar that partially defines the right door opening. One of the left first pillar and the left second pillar defines a plurality of left channels. One of the right first pillar and the right second pillar defines a plurality of right channels. Each left interface body is coupled to the other one of the left first pillar and the left second pillar and received in a respective left channel of the plurality of left channels such that the left second pillar is outboard of the left first pillar and the left interface bodies inhibit the left second pillar from moving further outboard relative to the left first pillar. Each right interface body is coupled to the other one of the right first pillar and the right second pillar and received in a respective right channel of the plurality of right channels such that the right second pillar is outboard of the right first pillar and the right interface bodies inhibit the right second pillar from moving further outboard relative to the right first pillar. Each left attachment structure extends at least partially through the left first pillar and the left second pillar to secure the front and rear vehicle structures to each other. Each right attachment structure extends at least partially through the right first pillar and the right second pillar to secure the front and rear vehicle structures to each other.

In variations of the vehicle of the above paragraph, which can be implemented individually or in any combination:

each left attachment structure includes a plurality of first fasteners extending at least partially through the left first pillar and the left second pillar to secure the front and rear vehicle structures to each other; each right attachment structure includes a plurality of second fasteners extending at least partially through the right first pillar and the right second pillar to secure the front and rear vehicle structures to each other; each left attachment structure includes a first elongated stud plate having first studs extending therefrom and at least partially through the left first pillar and the left second pillar, and first fasteners extending at least partially through the left first pillar and the left second pillar; each right attachment structure includes a second elongated stud plate having second studs extending therefrom and at least partially through the right first pillar and the right second pillar, and second fasteners extending at least partially through the right first pillar and the right second pillar; the first and second studs have an adhesive coating; the left second pillar has a first outer surface with a first elongated groove formed therein, the right second pillar has a second outer surface with a second elongated groove formed therein, the first elongated stud plate is received in the first elongated groove such that the first elongated stud plate is flush with the first outer surface, the second elongated stud plate is received in the second elongated groove such that the second elongated stud plate is flush with the second outer surface; each left interface body of the plurality of left interface bodies includes a first end and a second end, the first end is located closer toward a front of the vehicle than the second end, each left interface body is tapered from the second end toward the first end; each right interface body of the plurality of right interface bodies includes a third end and a fourth end, the third end is located closer toward the front of the vehicle than the fourth end, each right interface body is tapered from the fourth end toward the third end; one left interface body of the plurality of left interface bodies is located near an upper portion of the left first pillar and another left interface body of the plurality of left interface bodies is located near a lower portion of the left first pillar; each left interface body of the plurality of left interface bodies includes a plurality of sides, at least one side of the plurality of sides has an adhesive coating; one or more of vehicle components secured to the front vehicle structure; the one or more vehicle components include a front suspension assembly, an instrument panel structure, a front motor and a front subframe; one or more vehicle components secured to the rear vehicle structure; and the one or more vehicle components include a rear motor, a rear subframe, and a battery pack.

In another vehicle, the present disclosure discloses a vehicle that includes a front vehicle structure, a rear vehicle structure, a plurality of left tapered interface bodies, a plurality of right tapered interface bodies, a left attachment structure, and a right attachment structure. The front vehicle structure includes a left first pillar and a right first pillar. The rear vehicle structure defines a left door opening and a right door opening and includes a left second pillar that partially defines the left door opening and a right second pillar that partially defines the right door opening. The left second pillar defines a plurality of left channels and the right second pillar defines a plurality of right channels. Each left tapered interface body is coupled to the left first pillar and is received in a respective left channel of the plurality of left channels such that the left second pillar is outboard of the left first pillar and the left tapered interface bodies inhibit the left second pillar from moving further outboard relative to the left first pillar. Each right tapered interface body is coupled to the right first pillar and is received in a respective right channel of the plurality of right channels such that the right second pillar is outboard of the right first pillar and the right tapered interface bodies inhibit the right second pillar from moving further outboard relative to the right first pillar. The left attachment structure includes a plurality of first fasteners extending at least partially through the left first pillar and the left second pillar to secure the front and rear vehicle structures to each other. The right attachment structure includes a plurality of second fasteners extending at least partially through the right first pillar and the right second pillar to secure the front and rear vehicle structures to each other.

In variations of the vehicle of the above paragraph, which can be implemented individually or in any combination: the left attachment structure further includes a first elongated stud plate having first studs extending therefrom and at least partially through the left first pillar and the left second pillar; the right attachment structure includes a second elongated stud plate having second studs extending therefrom and at least partially through the right first pillar and the right second pillar; the first and second studs have an adhesive coating; one or more of vehicle components secured to the front vehicle structure; the one or more vehicle components include a front suspension assembly, an instrument panel structure, a front motor and a front subframe; one or more vehicle components secured to the rear vehicle structure; and the one or more vehicle components include a rear motor, a rear subframe, and a battery pack.

In another vehicle, the present disclosure discloses a vehicle that includes a front vehicle structure, a rear vehicle structure, a plurality of left tapered interface bodies, a plurality of right tapered interface bodies, a left attachment structure, and a right attachment structure. The front vehicle structure includes a left first pillar and a right first pillar. The rear vehicle structure defines a left door opening and a right door opening and including a left second pillar that partially defines the left door opening and a right second pillar that partially defines the right door opening. The left second pillar defines a plurality of left channels and the right second pillar defines a plurality of right channels. Each left tapered interface body is coupled to the left first pillar and is received in a respective left channel of the plurality of left channels such that the left second pillar is outboard of the left first pillar and the left tapered interface bodies inhibit the left second pillar from moving further outboard relative to the left first pillar. Each right tapered interface body is coupled to the right first pillar and is received in a respective right channel of the plurality of right channels such that the right second pillar is outboard of the right first pillar and the right tapered interface bodies inhibit the right second pillar from moving further outboard relative to the right first pillar. The left attachment structure includes a first elongated stud plate and first fasteners. The first elongated stud plate has first studs extending therefrom and at least partially through the left first pillar and the left second pillar. The first fasteners extend at least partially through the left first pillar and the left second pillar to further secure the front and rear vehicle structures to each other. The right attachment structure includes a second elongated stud plate and second fasteners. The second elongated stud plate has second studs extending therefrom and at least partially through the right first pillar and the right second pillar. The second fasteners extending at least partially through the right first pillar and the right second pillar to further secure the front and rear vehicle structures to each other. One or more of first vehicle components secured to the front vehicle structure. The one or more first vehicle components include a front suspension assembly, an instrument panel structure, a front motor and a front subframe. One or more of second vehicle components secured to the rear vehicle structure. The one or more second vehicle components include a rear motor, a rear subframe, and a battery pack.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
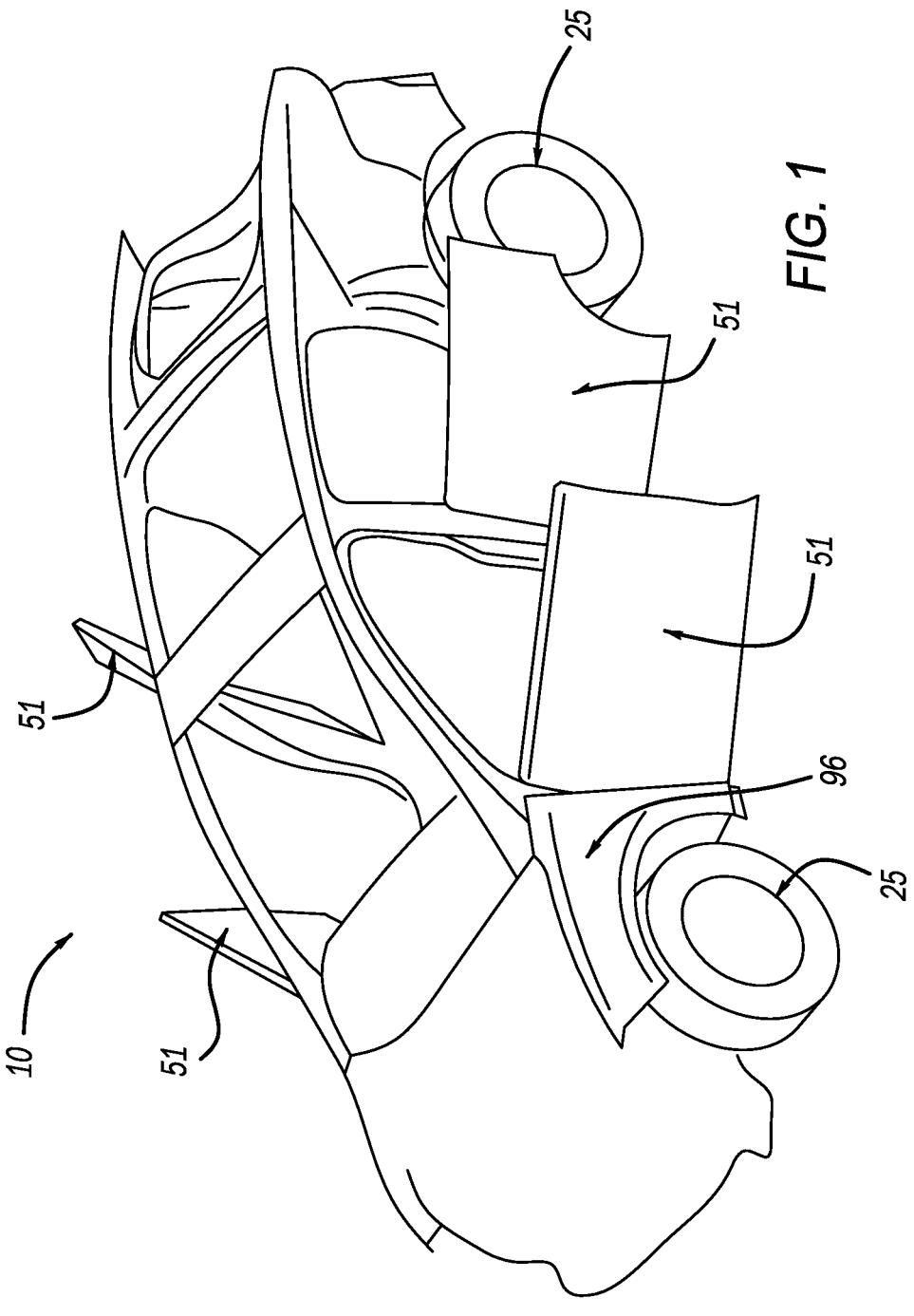
FIG. 1 is a perspective view of a portion of a vehicle including a front vehicle structure and a rear vehicle structure according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. In still other examples, the vehicle 10 may be an internal combustion engine driven vehicle.

Figure 2:
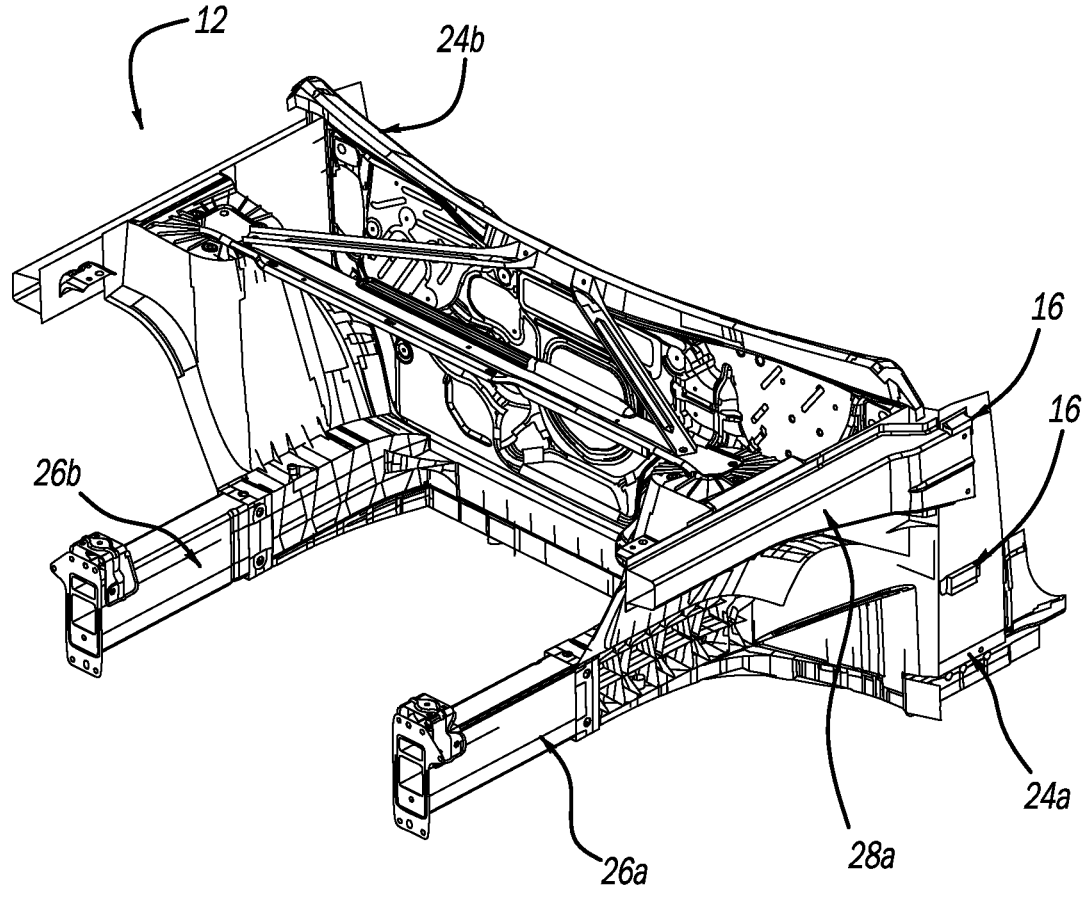
FIG. 2 is a perspective view of the front vehicle structure of the vehicle of FIG. 1 with vehicle components removed therefrom for clarity.
Figure 5:
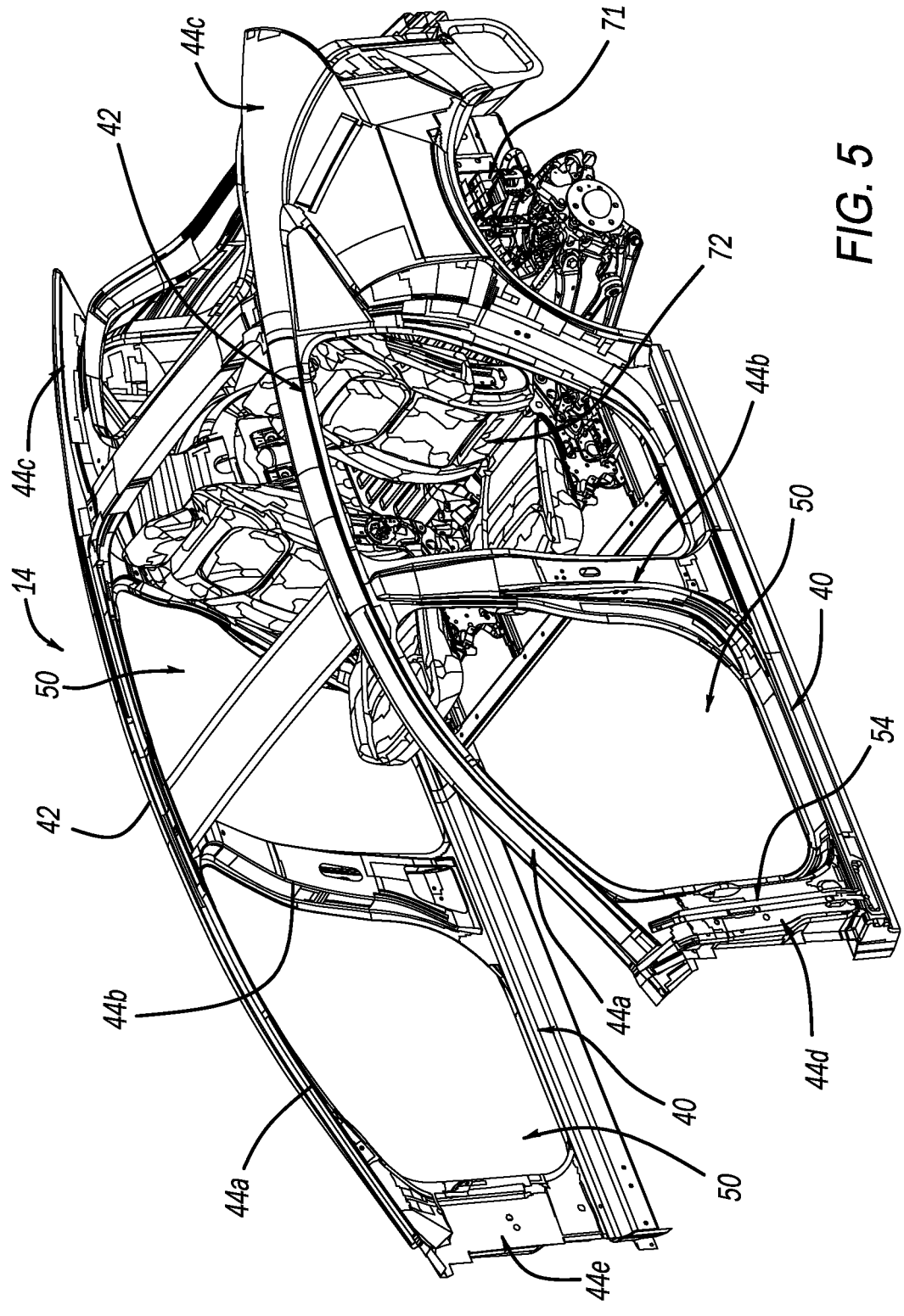
FIG. 5 is a perspective view of the rear vehicle structure of the vehicle of FIG. 1 with vehicle components secured thereto.
Figure 7A:
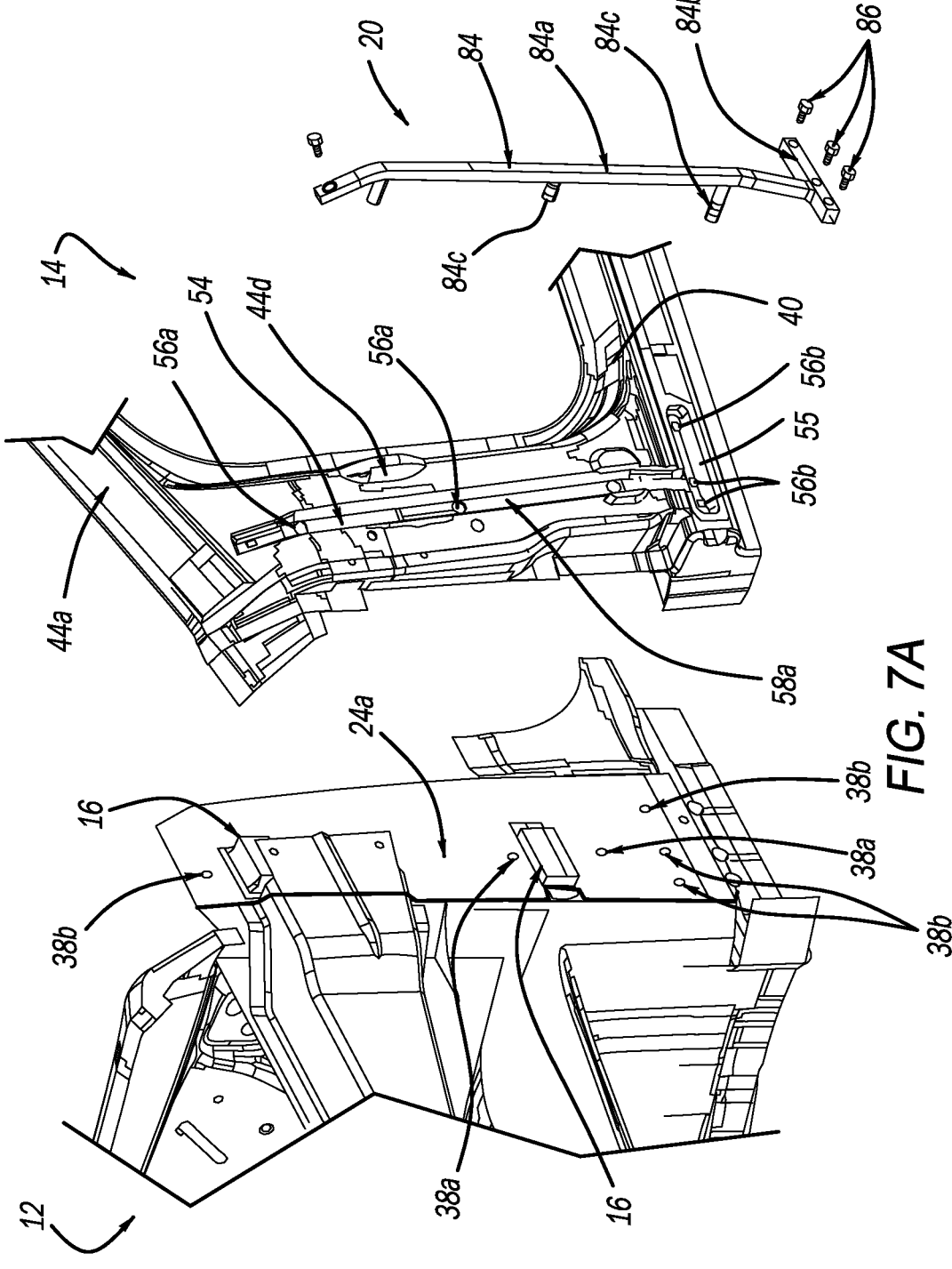
FIG. 7A is an exploded perspective view of a portion of the front vehicle structure of FIG. 1 and a portion of the rear vehicle structure of FIG. 1.
Figure 7B:
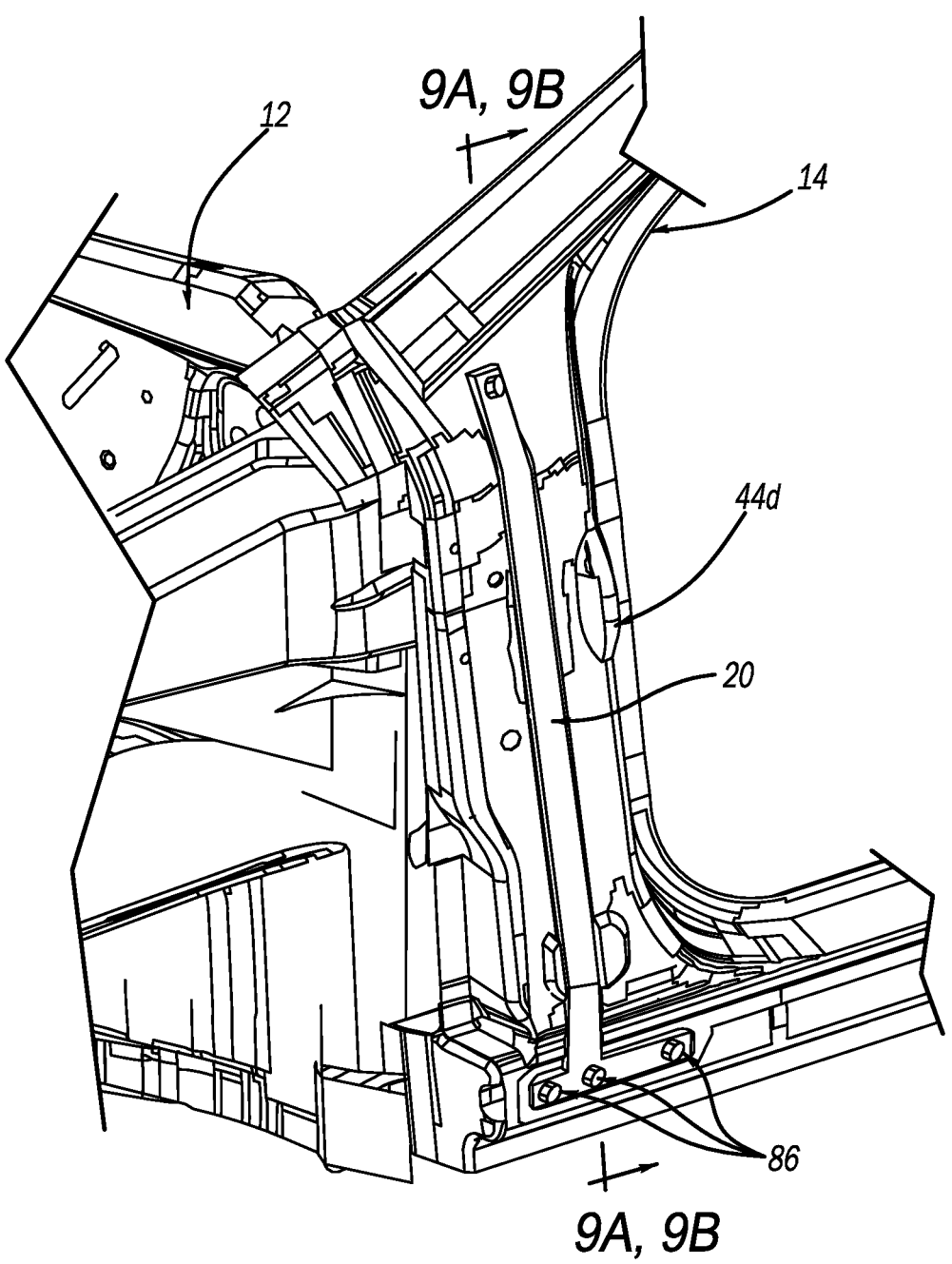
FIG. 7B is a perspective view of the portion of the front vehicle structure of FIG. 1 coupled to the portion of the rear vehicle structure of FIG. 1.

With additional reference to FIGS. 2, 5, 7A, the vehicle 10 includes a front vehicle structure 12 (FIGS. 2 and 7A), a rear vehicle structure 14 (FIGS. 5 and 7A), a plurality of left interface bodies or blocks 16 (shown schematically in FIGS. 2 and 7A), a plurality of right interface bodies (not shown), a left attachment structure 20 (FIG. 7A), and a right attachment structure (not shown). The front vehicle structure 12 is located closer toward a front of the vehicle 10 than the rear vehicle structure 14 and is coupled to the rear vehicle structure 14 as described in more detail below. In one example, the front vehicle structure 12 is manufactured using a plurality of stamp parts that are secured to each other, e.g., by welding, adhesive, or fasteners. In another example, the front vehicle structure 12 is manufactured using a casting process. With reference to FIG. 2, the front vehicle structure 12 includes, inter alia, a pair of hinge pillars 24a, 24b, a pair of inner rails 26a, 26b, a pair of upper rails 28a, 28b, and a bumper (not shown). Each inner rail 26a, 26b extends from a lower portion of a respective hinge pillar 24a, 24b to the bumper. Each inner rail 26a, 26b can also be arcuate and extend around a front wheel 25 (FIG. 1) of the vehicle 10 and form a portion of a respective front wheel well. The upper rails 28a, 28b are positioned above the pair of inner rails 26a, 26b and extend from an upper portion of a respective hinge pillar 24a, 24b toward a front of the vehicle 10. The bumper extends in a transverse direction relative to a longitudinal direction of the vehicle 10 and is secured to front ends of the pair of inner rails 26a, 26b.

Figure 3:
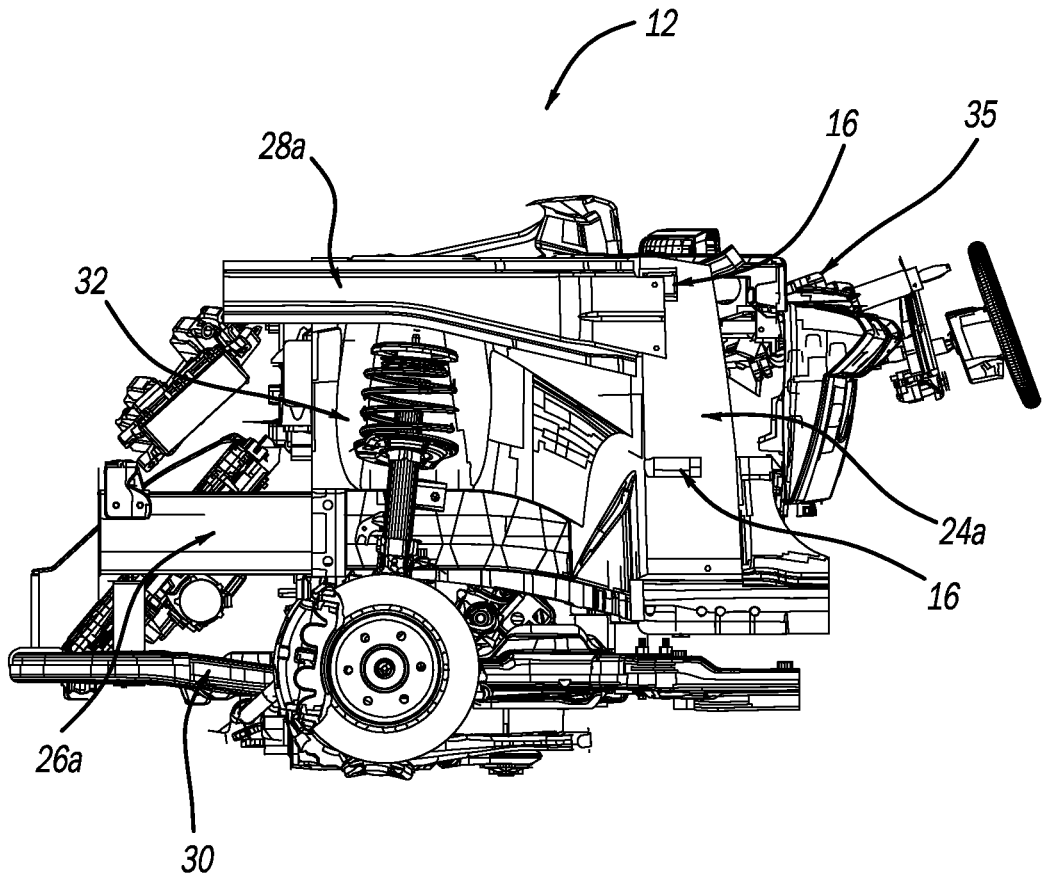
FIG. 3 is a side view of the front vehicle structure of the vehicle of FIG. 1 with vehicle components secured thereto.
Figure 4:
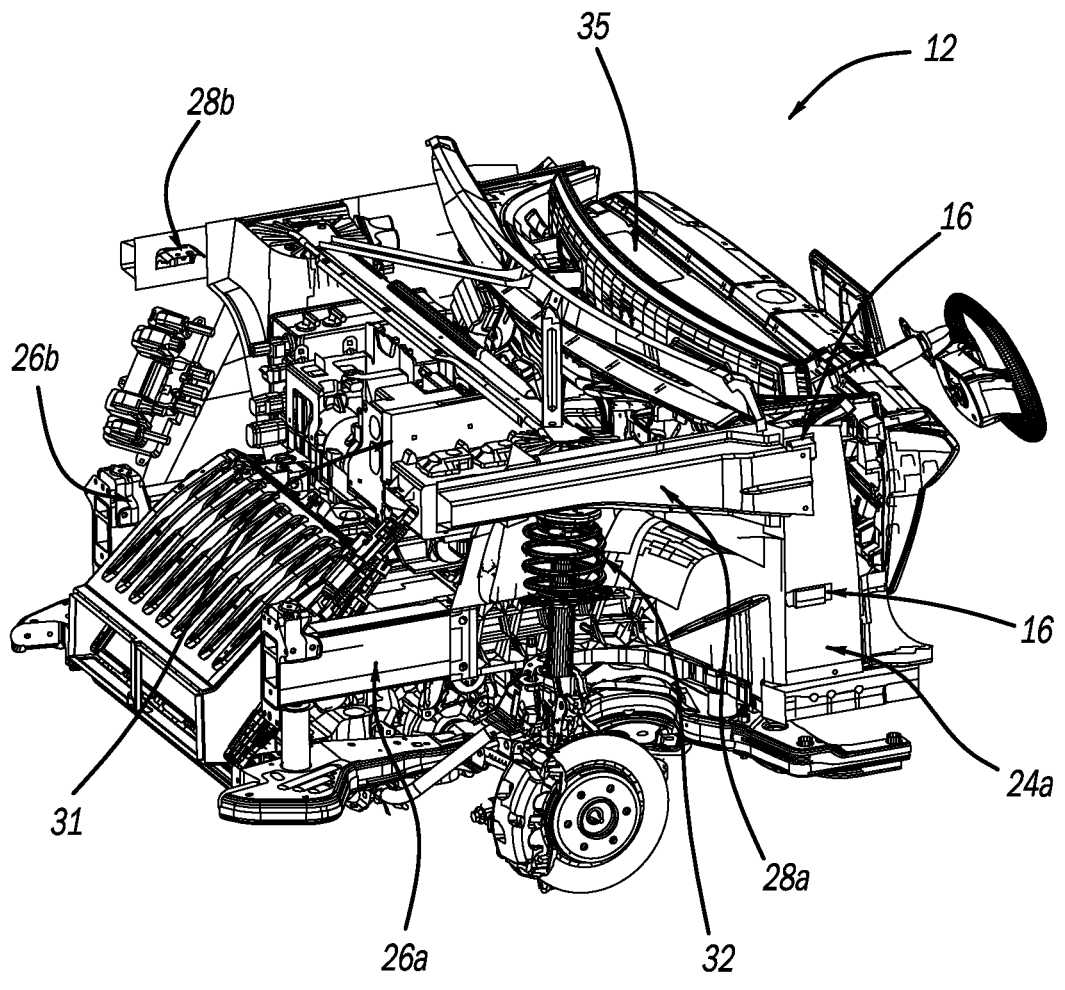
FIG. 4 is a perspective view of the front vehicle structure of the vehicle of FIG. 1 with vehicle components secured thereto.

With reference to FIGS. 3 and 4, a front subframe 30 is positioned below the front vehicle structure 12 and is secured to the pair of inner rails 26a, 26b of the front vehicle structure 12. The front subframe 30 may support one or more components of the vehicle 10 such as a front motor 31 (FIG. 4) and front suspension components 32 that may also be coupled to the front vehicle structure 12. The front motor 31 is powered by a battery pack (not specifically shown) to selectively drive the front wheels 25 (FIG. 1; only one wheel shown in the figure). The front suspension components 32 provide a smooth ride by absorbing energy from various road bumps while driving. The front suspension components 32 may include upper and lower control arms, springs, shock absorbers, struts, and ball joints, for example. It should also be understood that other components may be coupled to the front vehicle structure 12 such as an instrument panel structure 35 and electronics (e.g., inverters, AC-DC converter, and DC-DC converter). With reference to FIG. 7A, each hinge pillar 24a, 24b includes a plurality of first apertures 38a extending therethrough and a plurality of second apertures 38b extending therethrough.

Figure 6:
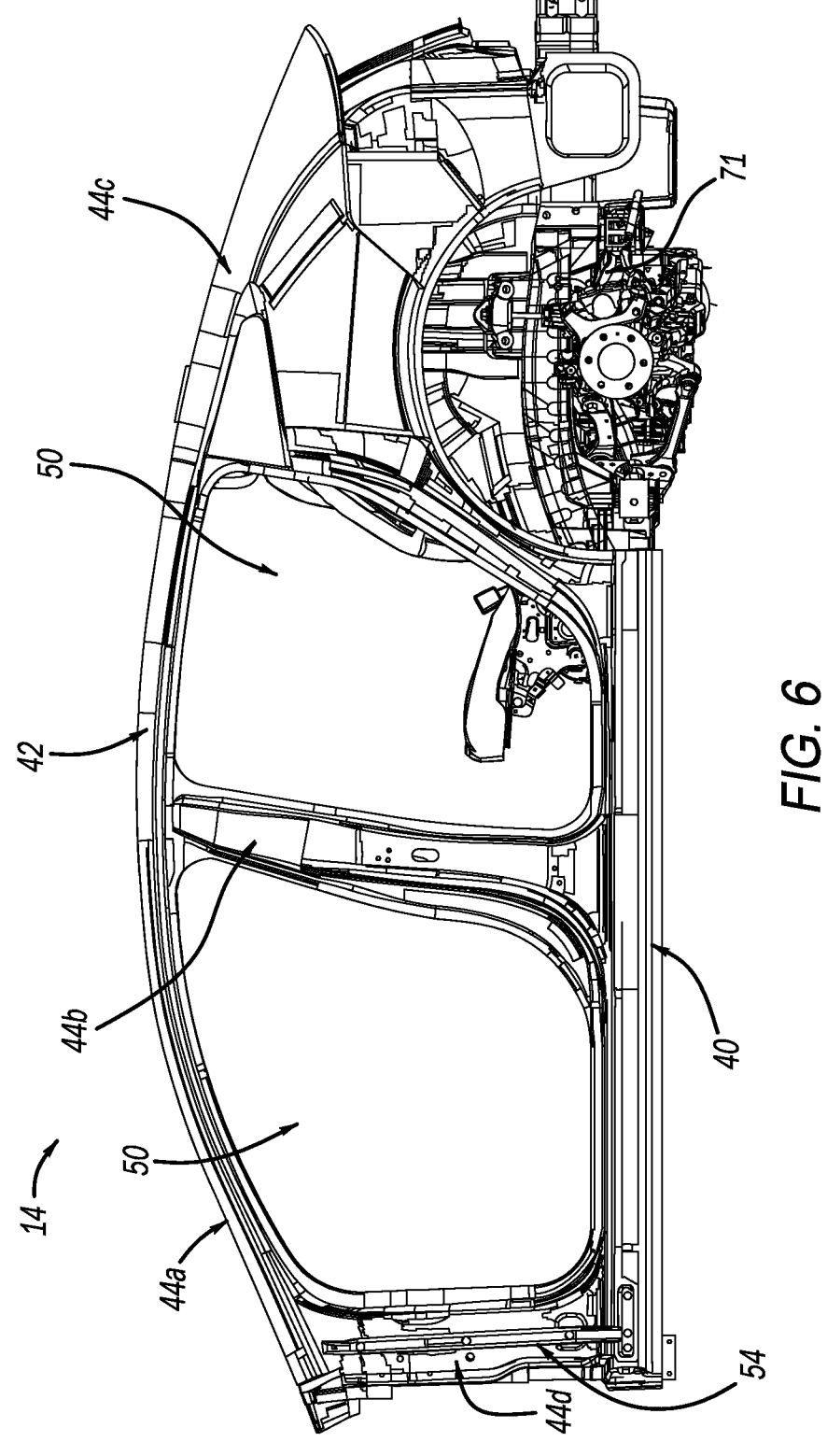
FIG. 6 is a side view of the rear vehicle structure of the vehicle of FIG. 1 with vehicle components secured thereto.

With reference to FIGS. 5, 6, and 7A, the rear vehicle structure 14 includes rockers 40, roof side rails 42, and a plurality of pillars (e.g., a pair of front pillars 44a, a pair of middle pillars 44b, a pair of rear pillars 44c and a pair of hinge pillars 44d, 44e). The rockers 40 extend lengthwise in a longitudinal direction of the vehicle 10 and may be configured to mount the battery pack (not specifically shown) to the rear vehicle structure 14. Each rocker 40 is made of a metal material such as aluminum, for example, and may be secured to a respective side of the battery pack using fasteners, adhesives, welding, or any other suitable attachment means, for example.

Each roof side rail 42 is positioned at a side of the rear vehicle structure 14 and extends along the longitudinal direction of the vehicle 10. Each roof side rail 42 includes one or more structural members extending along the longitudinal direction of the vehicle 10. Each front pillar 44a extends in the longitudinal direction of the vehicle 10 and downward from a respective roof side rail 42 to a respective hinge pillar 44d, 44e. Each middle pillar 44b extends in a vertical direction from a respective roof side rail 42 to a respective rocker 40. Each rear pillar 44c extends toward a rear of the vehicle 10 from an end of a respective roof side rail 42. The front pillars 44a, the middle pillars 44b, the hinge pillars 44d, 44e, the rockers 40 and the roof side rails 42 cooperate to define door openings 50 in the rear vehicle structure 14. Doors 51 (FIG. 1) are rotatably coupled to the rear vehicle structure 14 and movable between a closed position in which the doors 51 are disposed within the door openings 50 and an open position in which the doors 51 are removed from the door openings 50.

Figure 9A:
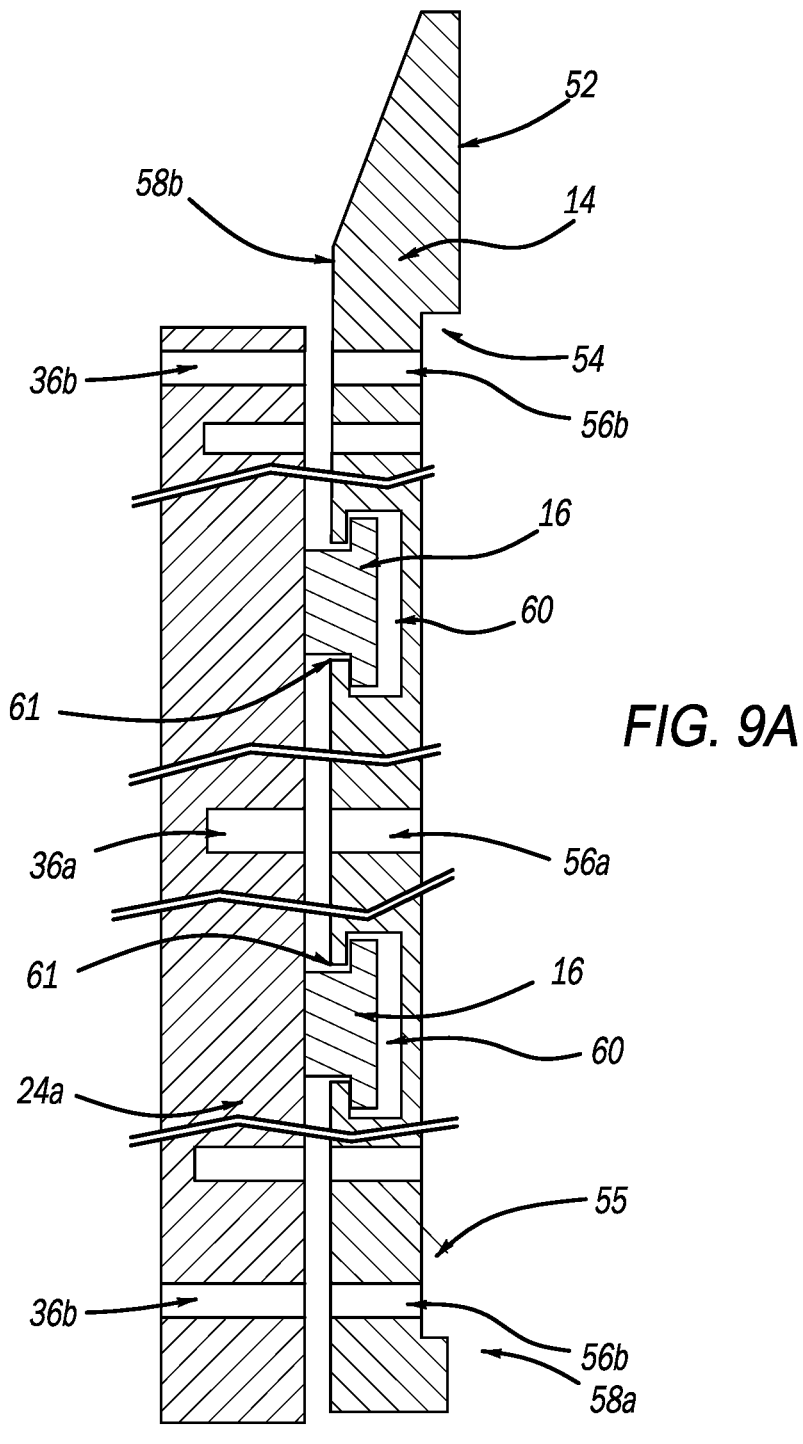
FIG. 9A is a cross-sectional view of the portion of the front vehicle structure of FIG. 1 coupled to the portion of the rear vehicle structure of FIG. 1, taken along line 9A-9A shown in FIG. 7B, and illustrating interface blocks partially received in channels of the rear vehicle structure.
Figure 9B:
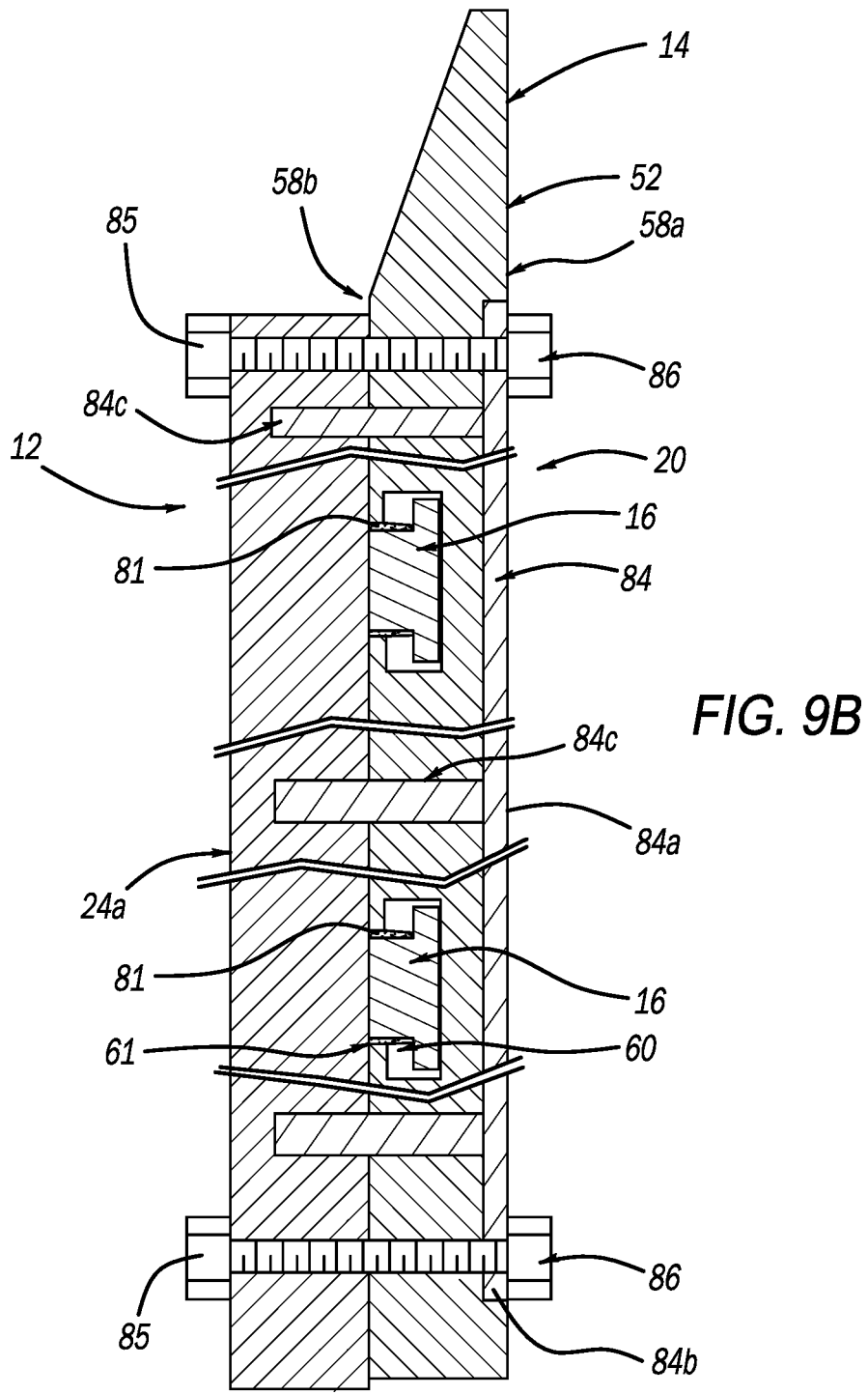
FIG. 9B is a cross-sectional view similar to FIG. 9A, illustrating the interface blocks fully received in the channels of the rear vehicle structure of FIG. 1.

With reference to FIGS. 7A, 9A, and 9B, the hinge pillar 44d extends in a vertical direction (FIG. 7A) from an end of a respective front pillar 44a to an end of a respective rocker 40. In the example illustrated, the hinge pillar 44d has an exterior side 58a that faces away from the front vehicle structure 12 (e.g., an outboard direction) when the front and rear vehicle structures 12, 14 are coupled to each other, and an interior side 58b that faces toward the front vehicle structure 12 (e.g., an inboard direction) when the front and rear vehicle structures 12, 14 are coupled to each other. The hinge pillar 44d includes an outer surface 52 at the exterior side 58a that has an elongated groove or recess 54 (FIG. 9A) formed therein. In some forms, the hinge pillar 44d may not include the elongated recess 54 formed therein. The hinge pillar 44d includes a plurality of channels 60 formed therein at the interior side 58b that are configured to receive respective interface blocks 16 as will be described in greater detail below. Openings 61 may be in communication with respective channels 60 formed in the hinge pillar 44d and may open through interior side 58b.

With reference to FIG. 9A, the hinge pillar 44d includes one or more first apertures 56a extending therethrough and one or more second apertures 56b extending therethrough. Each first aperture 56a of the first apertures 56a is horizontally aligned with a first aperture 36a of a respective hinge pillar 24a when the front and rear vehicle structures 12, 14 are coupled to each other. Similarly, each second aperture 56b of the second apertures 56b is horizontally aligned with a second aperture 36b of a respective hinge pillar 24a, 24b when the front and rear vehicle structures 12, 14 are coupled to each other. At least one of the first apertures 56a and at least one of the second apertures 56b are located in the elongated recess 54 formed in the hinge pillar 24 (i.e., the apertures 56a, 56b opens through to the elongated recess 54). In some forms, at least one of the first apertures 56a and at least one of the second apertures 56b may also be located in a recess 55 formed in a respective rocker 40. In the example illustrated, the recess 54 of the hinge pillar 24 and the recess 55 of the rocker 40 cooperate to form a T-shape. The structure and function of hinge pillar 44e may be similar or identical to that of hinge pillar 44d, and therefore, will not be described again in detail.

With reference to FIGS. 5 and 6, a rear subframe 70 is secured to the rear vehicle structure 14 and may support one or more components of the vehicle 10 such as a rear motor 71 that may also be coupled to the rear vehicle structure 14.

The rear motor 71 is powered by the battery pack (not specifically shown) to selectively drive rear wheels 25 (only one shown in FIG. 1) of a set of rear wheels. It should also be understood that other components may be coupled to the rear vehicle structure 14 such as a vehicle floor (not shown), rear suspension components and the battery pack. The vehicle floor may support one or more vehicle seats 72 or rows of seats. The rear suspension components provide a smooth ride by absorbing energy from various road bumps while driving. The rear suspension components may include upper and lower control arms, springs, shock absorbers, struts, and ball joints, for example. The battery pack may be rechargeable and may include lithium-ion batteries or any other suitable electrical power storage units. The battery pack may be disposed at and mounted to various locations of the rear vehicle structure 14. In this way, the battery pack is supported by the rear vehicle structure 14 and is remote from a passenger cabin (not shown) and cargo compartments (not shown) of the vehicle 10, therefore, not occupying space that would otherwise be available for passengers or cargo.

Figure 8:
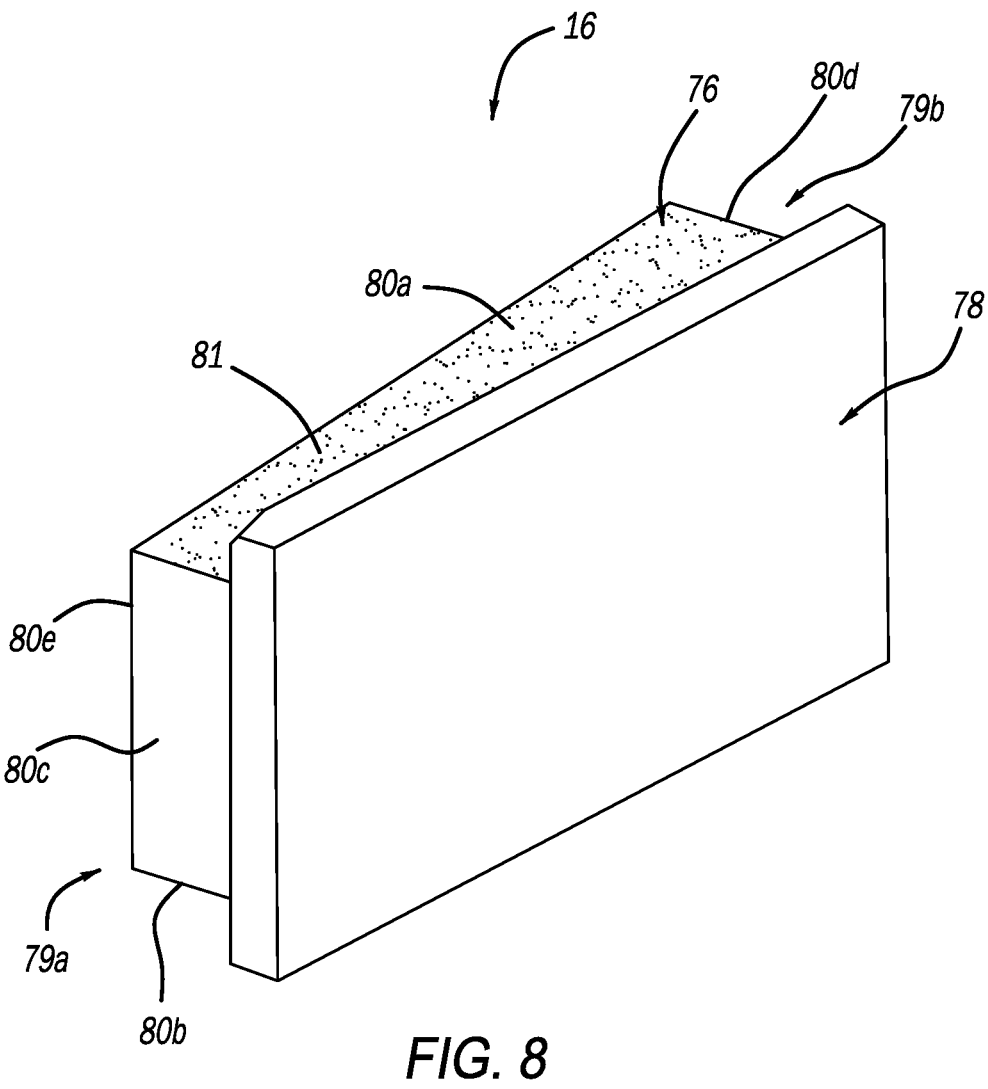
FIG. 8 is a perspective view of one interface block for coupling the portion of the front vehicle structure of FIG. 1 to the portion of the rear vehicle structure of FIG. 1, according to the principles of the present disclosure.

With reference to FIGS. 7A, 8, 9B, the plurality of left interface bodies 16 are coupled to the hinge pillar 24a (FIGS. 7A and 9B) and are spaced apart from each other. In the example illustrated, the plurality of left interface bodies 16 are aligned with each other in a vertical direction. In some forms, the left interface bodies 16 may not be vertically aligned with each other (i.e., the left interface bodies 16 may be offset from each other). In some configurations, the left interface bodies 16 are secured to the hinge pillar 24a using mechanical fasteners such as bolts, rivets, and/or screws, for example. In other configurations, the front vehicle structure 12 may be manufactured using a casting process such that the left interface bodies 16 are integrally formed as part of the front vehicle structure 12. Each left interface body 16 is received in a respective channel 60 of the hinge pillar 44d as will be described in more detail below such that the hinge pillar 44d is outboard of the hinge pillar 24a of the front vehicle structure 12 and the left interface body 16 inhibits the hinge pillar 44d from moving further outboard relative to the hinge pillar 24a.

With reference to FIG. 8, each left interface body 16 includes a body portion 76 and a flange portion 78 secured to the body portion 76. The body portion 76 is secured to the hinge pillar 24a and has a first end 79a and a second end 79b. The first end 79a is located closer toward the front of the vehicle 10 than the second end 79b. In the example illustrated, the body portion 76 is tapered from the second end 79b toward the first end 79a (i.e., the second end 79b has a width that is greater than a width of the first end 79a). The body portion 76 includes a plurality of sides 80a, 80b, 80c, 80d, 80e. At least a portion of one side of the plurality of sides 80a, 80b, 80c, 80d, 80e may include an adhesive coating 81. In the example illustrated, at least portions of the side 80a and the side 80b include an adhesive coating 81 although sides 80c, 80d, and 80e may also include an adhesive coating without departing from the scope of the present disclosure. The plurality of right interface bodies (not shown) are coupled to the hinge pillar 24b. The structure and function of the right interface bodies are similar or identical to the left interface bodies 16 described above, and therefore, will not be described again in detail.

With reference to FIGS. 7A and 9B, the left attachment structure 20 extends at least partially through the hinge pillar 24a of the front vehicle structure 12 and hinge pillar 44d of the rear vehicle structure 14 to secure the front and rear vehicle structures 12, 14 to each other. In the example illustrated, the left attachment structure 20 includes a stud plate 84 and a plurality of fasteners 86. In the example illustrated, the stud plate 84 has a T-shape and has a square shaped cross-section. In other forms, the stud plate 84 may have a different shape (e.g., I-shape) and may have a rectangular-shaped cross-section, circular-shaped cross-section, or any other suitable shaped cross-section. The stud plate 84 includes a vertical portion 84a that is disposed within the recess 54 in the hinge pillar 44d and a horizontal portion 84b that is disposed within the recess 55 in the rocker 40. In this way, the stud plate 84 is flush with the outer surface 52 of the hinge pillar 44d (FIG. 9B).

The stud plate 84 also includes a plurality of studs 84c extending therefrom and at least partially through the hinge pillar 24a of the front vehicle structure 12 and through the hinge pillar 44d of the rear vehicle structure 14. Stated differently, the studs 84c extend through the first apertures 56a of the hinge pillar 44d of the rear vehicle structure 14 and at least partially through the first apertures 38a of the hinge pillar 24 of the front vehicle structure 12. In the example illustrated, surfaces of the studs 84c include an adhesive coating. Fasteners 86 extend through the stud plate 84, through the second apertures 56b of the hinge pillar 44d of the rear vehicle structure 14 and through the second apertures 38b of the hinge pillar 24a of the front vehicle structure 12, thereby further securing the front vehicle structure 12 and the rear vehicle structure 14 to each other. Nuts 85 may be secured to the fasteners 86. In some forms, the stud plate 84 may be omitted in the left attachment structure 20 and the left attachment structure 20 may include only fasteners extending through the hinge pillar 44d of the rear vehicle structure 14 and through the hinge pillar 24a of the front vehicle structure 12. The structure and function of the right attachment structure are similar or identical to the left attachment structure 20 described above, and therefore, will not be described again in detail.

Figure 10A:
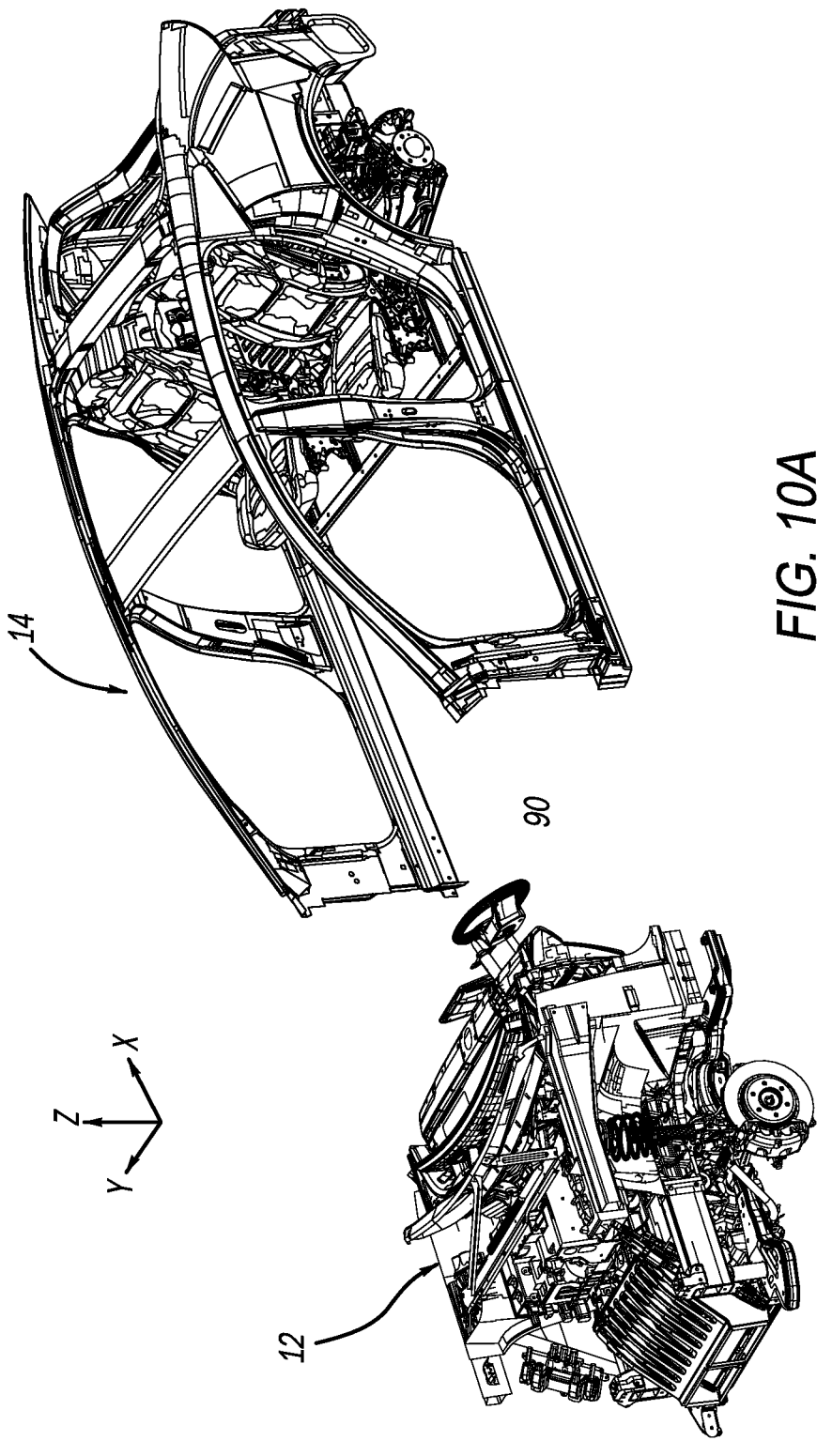
FIGS. 10A-10C are perspective views of the front vehicle structure of FIG. 1 and the rear vehicle structure of FIG. 1 being assembled to each other according to the principles of the present disclosure.

With reference to FIGS. 9A, 9B, and 10A-10C, assembly of the front vehicle structure 12 and the rear vehicle structure 14 to each other will be described in detail. First, as shown in FIG. 10A, the rear vehicle structure 14 is positioned adjacent to the front vehicle structure 12 and the front and rear vehicle structures 12, 14 are aligned with each other along an X-direction. The front vehicle structure 12 may include one or more vehicle components secured thereto as described above and the rear vehicle structure 14 may include one or more vehicle components secured thereto as described above.

Figure 10B:
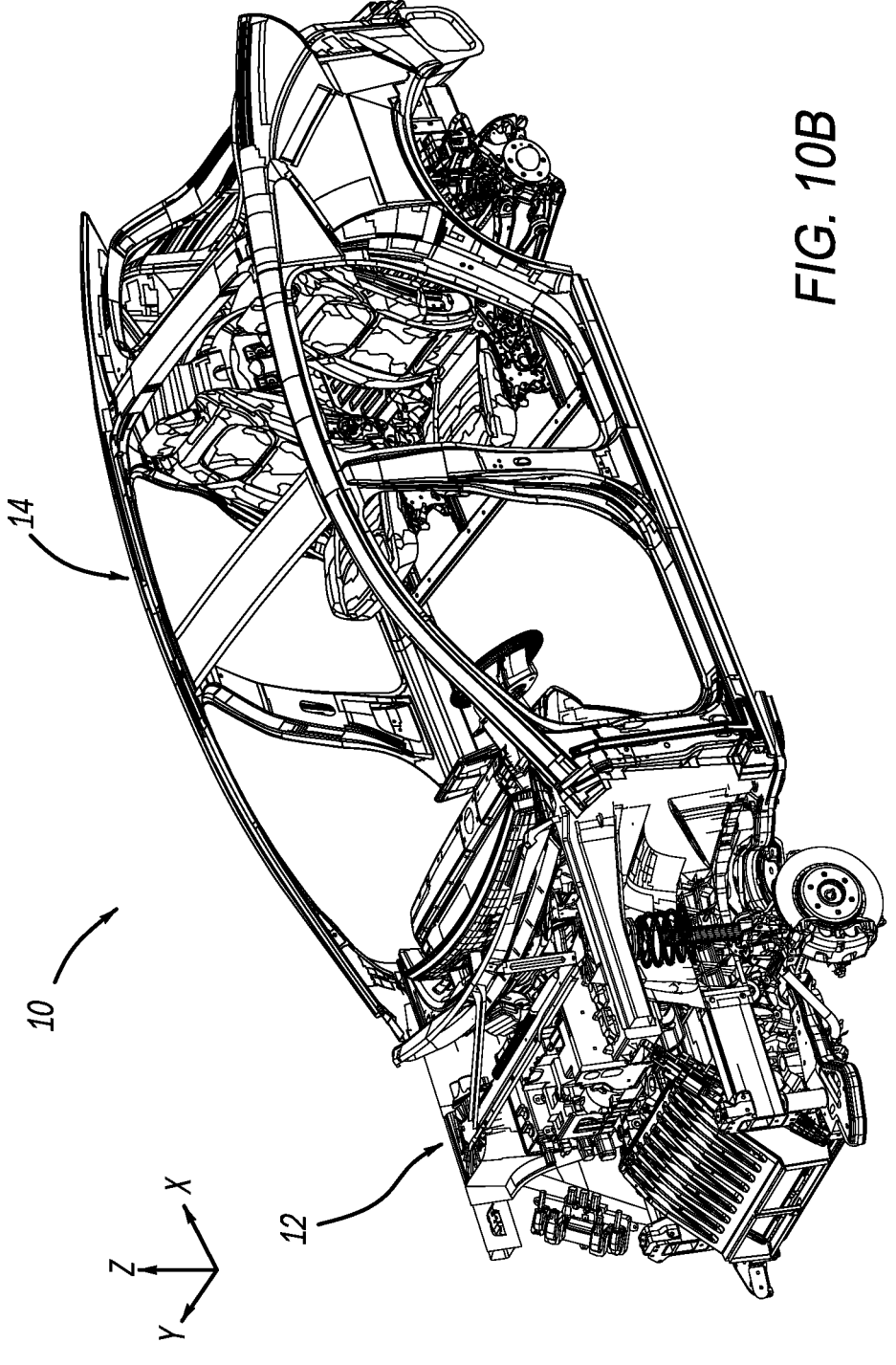

Next, as shown in FIGS. 9B and 10B, one of the front vehicle structure 12 and the rear vehicle structure 14 is moved toward the other of the front vehicle structure 12 and the rear vehicle structure 14 such that the left interface blocks 16 are received in respective channels 60 of the rear vehicle structure 14 (FIG. 9B) and the right interface blocks (not shown) are received in respective channels 60 of the rear vehicle structure 14. It should be understood that a gap exists between the hinge pillars 24a, 44d when the left interface blocks 16 are partially received in the respective channels 60 (FIG. 9A) and between the hinge pillars 24b, 44e when the right interface blocks are received in the respective channels 60. Once the left interface blocks 16 are fully received in the respective channels 60 (FIG. 9B), the hinge pillar 44d of the rear vehicle structure 14 engages the hinge pillar 24a of the front vehicle structure 12 and the adhesive coating on the left interface blocks 16 fills the space between the left interface blocks 16 and the hinge pillar 44d. Similarly, once the right interface blocks are fully received in the respective channels 60, the hinge pillar 44e of the rear vehicle structure 14 engages the hinge pillar 24*b* of the front vehicle structure 12 and the adhesive coating on the right interface blocks fills the space between the right interface blocks and the hinge pillar 44*e*.

A pair of guiding pins (not specifically shown) extend rearward from the pair of hinge pillars 24 of the front vehicle structure 12 toward the rear vehicle structure 14 and are received in respective grooves (not shown) in the rear vehicle structure 14 as the front and rear vehicle structures 12, 14 move toward each other. In this way, the pair of guiding pins align the front and rear vehicle structures 12, 14 to each other in a Z direction prior to the left interface blocks 16 being received in respective channels 60 of the rear vehicle structure 14 and the right interface blocks (not shown) being received in respective channels 60 of the rear vehicle structure 14.

Figure 10C:
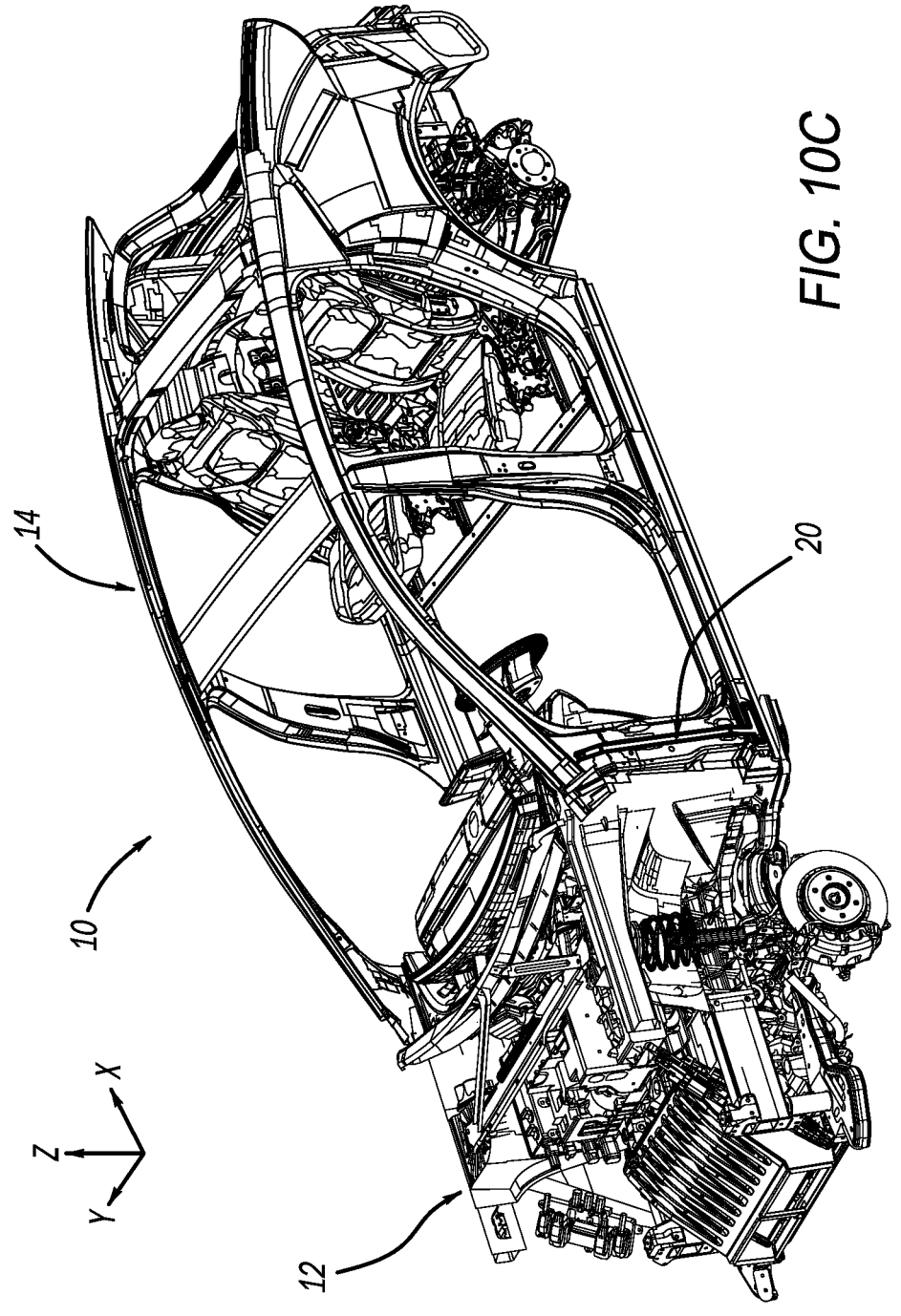

Next, as shown in FIGS. 9B and 10C, the left attachment structure 20 extends at least partially through the hinge pillar 24*a* of the front vehicle structure 12 and the hinge pillar 44*d* of the rear vehicle structure 14 to secure the front and rear vehicle structures 12, 14 to each other. Similarly, the right attachment structure (not shown) extends at least partially through the hinge pillar 24*b* of the front vehicle structure 12 and the hinge pillar 44*e* of the rear vehicle structure 14 to secure the front and rear vehicle structures 12, 14 to each other. Once the front vehicle structure 12 and the rear vehicle structure 14 are secured to each other, doors 51 (FIG. 1) are secured to the rear vehicle structure 14 and body panels 96 (FIG. 1) are secured to the front and rear vehicle structure 12, 14. The body panels 96 cover the left attachment structure 20 and the right attachment structure (not shown) such that they are hidden from view from outside of the vehicle 10.

A sealing member (not shown) may be coupled to (e.g., bonded to) a respective hinge pillar 24*a*, 24*b* of the front vehicle structure 12 and engages a respective hinge pillar 44*d*, 44*e* of the rear vehicle structure 14 when the front and rear vehicle structures are secured to each other, thereby inhibiting fluid and debris from entering the area including the left blocks 16 and left attachment structure 20 and right blocks (not shown) and right attachment structure (not shown).

The vehicle 10 of the present disclosure provides the front and rear vehicle structures 12, 14 that are secured to each other at hinge pillars 24*a*, 24*b*, 44*e*, 44*d* after each vehicle structure 12, 14 has been built up. That is, the front vehicle structure 12 is accessible from multiple sides and areas to secure one or more vehicle components thereto during the assembly process. Similarly, the rear vehicle structure 14 is accessible from multiple sides and areas to secure one or more vehicle components thereto during the assembly process. After the front and rear vehicle structures 12, 14 have been built up, the front and rear structures 12, 14 are conveniently secured to each other as described above. In this way, the assembly process of the vehicle 10 is enhanced. It should be understood that although the present disclosure describes the left interface blocks 16 being a part of the hinge pillar 24*a* of the front vehicle structure 12 and channels 60 formed in the hinge pillar 44*e* of the rear structure 14, one, more than one, or all of the left interface blocks 16 may be a part of the hinge pillar 44*d* of the rear vehicle structure 14 and the corresponding channels 60 may be formed in the hinge pillars 24*a* of the front vehicle structure 12 without departing from the scope of the present disclosure. Similarly, one, more than one, or all of the right interface blocks (not shown) may be a part of the hinge pillar 44*e* of the rear vehicle structure 14 and the corresponding channels may be formed in the hinge pillars 24*b* of the front vehicle structure 12 without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:

a front vehicle structure including a left first pillar and a right first pillar;

a rear vehicle structure defining a left door opening and a right door opening and including a left second pillar that partially defines the left door opening and a right second pillar that partially defines the right door opening, wherein one of the left first pillar and the left second pillar defines a plurality of left channels, and wherein one of the right first pillar and the right second pillar defines a plurality of right channels;

a plurality of left interface bodies, wherein each left interface body is coupled to the other one of the left first pillar and the left second pillar and received in a respective left channel of the plurality of left channels such that the left second pillar is outboard of the left first pillar and the left interface bodies inhibit the left second pillar from moving further outboard relative to the left first pillar;

a plurality of right interface bodies, wherein each right interface body is coupled to the other one of the right first pillar and the right second pillar and received in a respective right channel of the plurality of right channels such that the right second pillar is outboard of the right first pillar and the right interface bodies inhibit the right second pillar from moving further outboard relative to the right first pillar;

a plurality of left attachment structures, each left attachment structure extending at least partially through the left first pillar and the left second pillar to secure the front and rear vehicle structures to each other; and a plurality of right attachment structures, each right attachment structure extending at least partially through the right first pillar and the right second pillar to secure the front and rear vehicle structures to each other.

2. The vehicle of claim 1, wherein:

each left attachment structure includes a plurality of first fasteners extending at least partially through the left first pillar and the left second pillar to secure the front and rear vehicle structures to each other; and each right attachment structure includes a plurality of second fasteners extending at least partially through the right first pillar and the right second pillar to secure the front and rear vehicle structures to each other.

3. The vehicle of claim 1, wherein:

each left attachment structure includes a first elongated stud plate having first studs extending therefrom and at least partially through the left first pillar and the left second pillar, and first fasteners extending at least partially through the left first pillar and the left second pillar; and each right attachment structure includes a second elongated stud plate having second studs extending therefrom and at least partially through the right first pillar and the right second pillar, and second fasteners extending at least partially through the right first pillar and the right second pillar.

4. The vehicle of claim 3, wherein the first and second studs have an adhesive coating.

5. The vehicle of claim 3, wherein:

the left second pillar has a first outer surface with a first elongated groove formed therein;

the right second pillar has a second outer surface with a second elongated groove formed therein;

the first elongated stud plate is received in the first elongated groove such that the first elongated stud plate is flush with the first outer surface; and the second elongated stud plate is received in the second elongated groove such that the second elongated stud plate is flush with the second outer surface.

6. The vehicle of claim 1, wherein:

each left interface body of the plurality of left interface bodies includes a first end and a second end, the first end is located closer toward a front of the vehicle than the second end, each left interface body is tapered from the second end toward the first end; and each right interface body of the plurality of right interface bodies includes a third end and a fourth end, the third end is located closer toward the front of the vehicle than the fourth end, each right interface body is tapered from the fourth end toward the third end.

7. The vehicle of claim 1, wherein one left interface body of the plurality of left interface bodies is located near an upper portion of the left first pillar and another left interface body of the plurality of left interface bodies is located near a lower portion of the left first pillar.

8. The vehicle of claim 1, wherein each left interface body of the plurality of left interface bodies includes a plurality of sides, wherein at least one side of the plurality of sides has an adhesive coating.

9. The vehicle of claim 1, further comprising one or more of vehicle components secured to the front vehicle structure.

10. The vehicle of claim 9, wherein the one or more vehicle components include a front suspension assembly, an instrument panel structure, a front motor and a front subframe.

11. The vehicle of claim 1, further comprising one or more vehicle components secured to the rear vehicle structure.

12. The vehicle of claim 11, wherein the one or more vehicle components include a rear motor, a rear subframe, and a battery pack.

13. A vehicle comprising:

a front vehicle structure including a left first pillar and a right first pillar;

a rear vehicle structure defining a left door opening and a right door opening and including a left second pillar that partially defines the left door opening and a right second pillar that partially defines the right door opening, wherein the left second pillar defines a plurality of left channels and the right second pillar defines a plurality of right channels;

a plurality of left tapered interface bodies, wherein each left tapered interface body is coupled to the left first pillar and is received in a respective left channel of the plurality of left channels such that the left second pillar is outboard of the left first pillar and the left tapered interface bodies inhibit the left second pillar from moving further outboard relative to the left first pillar;

a plurality of right tapered interface bodies, wherein each right tapered interface body is coupled to the right first pillar and is received in a respective right channel of the plurality of right channels such that the right second pillar is outboard of the right first pillar and the right tapered interface bodies inhibit the right second pillar from moving further outboard relative to the right first pillar;

a left attachment structure including a plurality of first fasteners extending at least partially through the left first pillar and the left second pillar to secure the front and rear vehicle structures to each other; and a right attachment structure including a plurality of second fasteners extending at least partially through the right first pillar and the right second pillar to secure the front and rear vehicle structures to each other.

14. The vehicle of claim 13, wherein:

the left attachment structure further includes a first elongated stud plate having first studs extending therefrom and at least partially through the left first pillar and the left second pillar; and the right attachment structure includes a second elongated stud plate having second studs extending therefrom and at least partially through the right first pillar and the right second pillar.

15. The vehicle of claim 14, wherein the first and second studs have an adhesive coating.

16. The vehicle of claim 13, further comprising one or more of vehicle components secured to the front vehicle structure.

17. The vehicle of claim 16, wherein the one or more vehicle components include a front suspension assembly, an instrument panel structure, a front motor and a front subframe.

18. The vehicle of claim 13, further comprising one or more vehicle components secured to the rear vehicle structure.

19. The vehicle of claim 18, wherein the one or more vehicle components include a rear motor, a rear subframe, and a battery pack.

20. A vehicle comprising:

a front vehicle structure including a left first pillar and a right first pillar;

a rear vehicle structure defining a left door opening and a right door opening and including a left second pillar that partially defines the left door opening and a right second pillar that partially defines the right door opening, wherein the left second pillar defines a plurality of left channels and the right second pillar defines a plurality of right channels;

a plurality of left tapered interface bodies, wherein each left tapered interface body is coupled to the left first pillar and is received in a respective left channel of the plurality of left channels such that the left second pillar is outboard of the left first pillar and the left tapered interface bodies inhibit the left second pillar from moving further outboard relative to the left first pillar;

a plurality of right tapered interface bodies, wherein each right tapered interface body is coupled to the right first pillar and is received in a respective right channel of the plurality of right channels such that the right second pillar is outboard of the right first pillar and the right tapered interface bodies inhibit the right second pillar from moving further outboard relative to the right first pillar;

a left attachment structure includes a first elongated stud plate and first fasteners, the first elongated stud plate having first studs extending therefrom and at least partially through the left first pillar and the left second pillar, the first fasteners extending at least partially through the left first pillar and the left second pillar to further secure the front and rear vehicle structures to each other;

a right attachment structure includes a second elongated stud plate and second fasteners, the second elongated stud plate having second studs extending therefrom and at least partially through the right first pillar and the right second pillar, the second fasteners extending at least partially through the right first pillar and the right second pillar to further secure the front and rear vehicle structures to each other;

one or more of first vehicle components secured to the front vehicle structure, the one or more first vehicle components include a front suspension assembly, an instrument panel structure, a front motor and a front subframe; and one or more of second vehicle components secured to the rear vehicle structure, the one or more second vehicle components include a rear motor, a rear subframe, and a battery pack.

* * * * *